United States Patent Office 2,698,840
Patented Jan. 4, 1955

2,698,840

COPOLYMERS OF MONOVINYL AROMATIC COMPOUNDS AND LINOLEIC ACID ESTERS

Elizabeth Dyer, Newark, Del., and George A. Weisgerber, Iselin, N. J., assignors to Armstrong Cork Company, Lancaster, Pa., a corporation of Pennsylvania No Drawing. Application August 14, 1952,
Serial No. 304,440

6 Claims. (Cl. 260—23)

This invention relates to the preparation of new and useful copolymers. More particularly, the invention relates to the production of copolymers by copolymerizing a mixture containing a vinyl aromatic compound and a linoleic acid ester, particularly linoleic acid esters of 1,2-dihydroxy-butene 3.

Linoleic acid is a well-known dienoic acid which occurs in many vegetable drying oils. For example, linseed oil contains approximately 61.5% of linoleic acid. Other drying oils which are high in linoleic acid content are soya bean oil, cottonseed oil, and safflower oil. Linoleic acid generally exists in the form having the following structural formula:

$CH_3(CH_2)_4CH=CHCH_2CH=CH(CH_2)_7COOH$ 1,2-dihydroxy-3-butene, also known as erythrol, is an unsaturated polyhydric alcohol. We have found that erythrol may be esterified with linoleic acid to produce both erythryl dilinoleate and erythryl monolinoleate. These linoleic acid esters may then be copolymerized with monovinyl aromatic compounds to produce linear copolymers which, upon second stage treatment, yield a cross-linked copolymer of reduced solubility and reduced fusibility. These materials may be employed in the production of coating compositions, as well as ingredients of binders for resilient floor coverings and the like.

As used herein, the term "monovinyl aromatic compound" or its equivalent is intended to include such compounds as those of the group consisting of styrene, para methylstyrene, para chlorostyrene, meta cholorostyrene, methoxystyrene, vinyl naphthalene, and the like.

In accordance with our invention, we first prepare erthryl dilinoleate by esterifying erythrol with linoleyl chloride, or its equivalent. The preparation is illustrated by the following specific example:

Example I 100 grams of linoleic acid were dissolved in 90 ml. of benzene and the solution was placed in a 3 neck round bottom flask with ground glass joints for a reflux condenser, stirrer, and dropping funnel. The solution was cooled in an ice salt bath and 90 grams (100% molar excess) of oxalyl chloride were added dropwise through the funnel, avoiding any vigorous reaction. At the completion of the oxalyl chloride addition, the temperature of the mixture was gradually raised and the exothermic reaction was maintained as gentle as possible. After vigorous reaction had subsided, the mixture was refluxed for two hours. The volatile components (oxalyl chloride and benzene) were removed, using downward distillation under gradually increasing suction from the water aspirator, with the external bath temperature reaching 100° C. The residue of linoleyl chloride was placed in a suitable distilling flask in a wax bath and distilled. 50 grams of distilled linoleyl chloride and 350 ml. of petroleum ether were added to a round bottom flask and the solution cooled in an ice bath. 15.3 grams of pyridine were added dropwise while stirring the solution. The white flocculent precipitate of the pyridinium salts immediately separated and 6.63 grams of erythrol were added. A ground glass reflux condenser was attached and the mixture refluxed on the steam bath for 4 hours. The mixture was filtered to remove the pyridinium salts and was diluted with 400 ml. of redistilled diethyl ether. The ether layer was washed with 200 ml. dilute hydrochloric acid and then repeatedly washed with water until the washings were neutral. The solution was dried over anhydrous sodium sulfate, filtered, and the solvent removed.

The ester obtained in Example I may be further purified by dissolving the same in redistilled petroleum ether and cooling to minus 69° C., when acidic impurities are precipitated. The filtrates may be employed in the preparation of the copolymers described hereinbelow. In lieu of crystallization to obtain the purified ester, we may dissolve a crude material in petroleum ether or other suitable solvent and agitate the solution in the presence of adsorptive alumina. After filtration, an isolation product substantially equivalent to that obtained by the crystallization technique may be employed in the production of copolymers.

Linoleic acid esters prepared as indicated above may be admixed with monovinyl aromatic compounds such as styrene and subjected to polymerization conditions. The conditions of polymerization may be varied; but, generally speaking, we have found that particularly advantageous results are obtained by heating a mixture of the ester and monovinyl aromatic compound at elevated temperatures, such as about 65° C. to about 100° C. to obtain the first stage polymerization; and in the second stage, the copolymer is heated further to induce cross linking and render the material relatively infusible and insoluble. The properties of the copolymers may be widely varied, depending upon the quantities of the respective ingredients present in the polymerizable mixture. For example, when high quantities of esters, such as about 85% by weight, are present, the copolymer is rather fluid in its characteristics. On the other hand, when the amount of styrene is increased, the products are, generally speaking, more viscous. We have obtained particularly advantageous results when polymerization mixture contains about 15% to about 35% by weight monovinyl aromatic compound such as styrene and about 85% to about 65% by weight linoleic ester.

The first stage polymerization in accordance with our invention is illustrated by the following specific examples:

Example II

A mixture containing 17.7 parts by weight of erythryl dilinoleate, 3 parts by weight of styrene (a molar ratio of ester to styrene of 1:1), and .8 part by weight of benzoyl peroxide was sealed under nitrogen in a glass tube and heated at 80° C. for 44 hours. The product obtained from this procedure was a viscous liquid which, upon treatment with a suitable organic liquid such as ethanol or methanol, yielded a gummy copolymer which was fusible and soluble in common solvents such as chloroform, benzene, or acetone.

Example III

A mixture containing 14.7 parts by weight of erythryl dilinoleate, 5 parts by weight of styrene, and 0.8 part by weight of benzoyl peroxide was sealed under nitrogen in a glass tube and heated at 80° C. for 44 hours. The product obtained from this procedure was a viscous liquid which, upon precipitation with ethanol, yielded a gummy linear copolymer which was fusible and soluble in common solvents.

Example IV

A mixture containing 9.4 parts by weight of erythryl dilinoleate and 1.6 parts by weight of styrene, together with 0.1 part by weight of bis-(p-chlorobenzoyl) peroxide was sealed under nitrogen in a glass tube and heated at 80° C. for 48 hours. A viscous liquid was obtained which could be precipitated with ethanol to yield a gummy linear copolymer soluble in common solvents.

The products of the above examples may be converted to hard glassy products by heating at elevated temperatures to effect cross linking, which reduces solubility and fusibility of the material.

Example V 0.2 to 0.3 gram of a copolymer prepared in accordance with Example II was placed in a small glass cup which was then transferred to a drying apparatus. The drying apparatus was flushed with nitrogen and evacuated. The copolymer was heated at a temperature of 78° C. for 24 hours. After cooling, a clear hard resin was obtained having 25.2% solubility in acetone after immersion for 48 hours at 25° C.

*Example VI*

0.2 to 0.3 gram of a copolymer prepared in accordance with Example IV was placed in a small glass cup which was then transferred to a drying apparatus. The drying apparatus was flushed with nitrogen and evacuated. The copolymer was heated at a temperature of 137° C. for 24 hours. After cooling, a clear hard resin was obtained having 18.8% solubility in benzene after immersion for 48 hours at 25° C.

Generally speaking, we find it advantageous to increase the ester content in the copolymer to facilitate cross linking. However, copolymers of high styrene content may be cross linked when more strenuous conditions of heat, time, contact with air, and agitation are employed. By means of our invention, we have provided copolymers which may be employed in a wide variety of uses where it is desired to obtain a product which may be heat treated to produce a hard clear coating material. Of course, if desired, coloring matter may be incorporated to produce the desired color. Our materials may be used to coat metal, for example, by applying the copolymer obtained by reacting the esters with the vinyl aromatic compounds and then subjecting the coated material to heat treatment to produce the clear hard coating composition.

In lieu of the purified esters, we may employ esters obtained by esterification of the acids obtained from drying oils which are rich in linoleic acid. For example, safflower seed oil acids may be obtained by means well known to the art and the resulting mixture of acids can be reacted with erythrol to produce valuable esterification products which can be later polymerized with vinyl aromatic compounds.

We claim:

1. A clear, hard, resinous copolymer of a monovinyl aromatic compound and the product obtained by esterifying linoleic acid with 1,2-dihydroxy-3-butene.

2. A clear, hard, resinous copolymer of styrene and the linoleic acid ester of 1,2-dihydroxy-3-butene.

3. A clear, hard, resinous copolymer of a monovinyl aromatic compound and the 1,2-dihydroxy-3-butene ester of a fatty acid fraction rich in linoleic acid.

4. The method of producing a clear, hard film which comprises forming a film of a copolymer of a monovinyl aromatic compound and the 1,2-dihydroxy-3-butene ester of linoleic acid and heating the resulting film in air at a temperature above 78° C.

5. A clear, hard, resinous copolymer containing about 15% to about 35% monovinyl aromatic compound and about 85% to about 65% linoleic ester of 1,2-dihydroxy-3-butene.

6. A clear, hard, resinous copolymer containing about 15% to about 35% styrene and about 85% to about 65% linoleic ester of 1,2-dihydroxy-3-butene.

References Cited in the file of this patent

Dyer et al., J. A. C. S., Aug. 1949, pp. 2728–30.
Whitmore et al., J. A. C. S., July 1949, pp. 2427–29.
Dyer et al., J. Amer. Oil Chem. Society, Nov. 1949, pp. 649–51.